May 16, 1939.　　　K. P. TESKE　　　2,158,094
METHOD OF FEEDING LIQUID MOLASSES
Filed March 25, 1938　　　3 Sheets-Sheet 1

K. P. TESKE INVENTOR.

BY *William C. Blackburn*

ATTORNEY

May 16, 1939.  K. P. TESKE  2,158,094
METHOD OF FEEDING LIQUID MOLASSES
Filed March 25, 1938  3 Sheets-Sheet 2
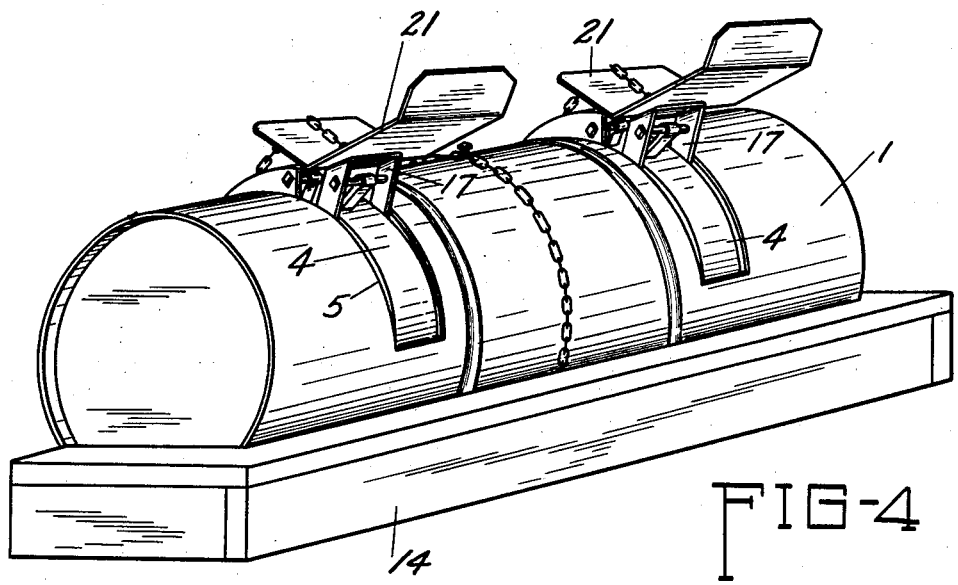
FIG-4
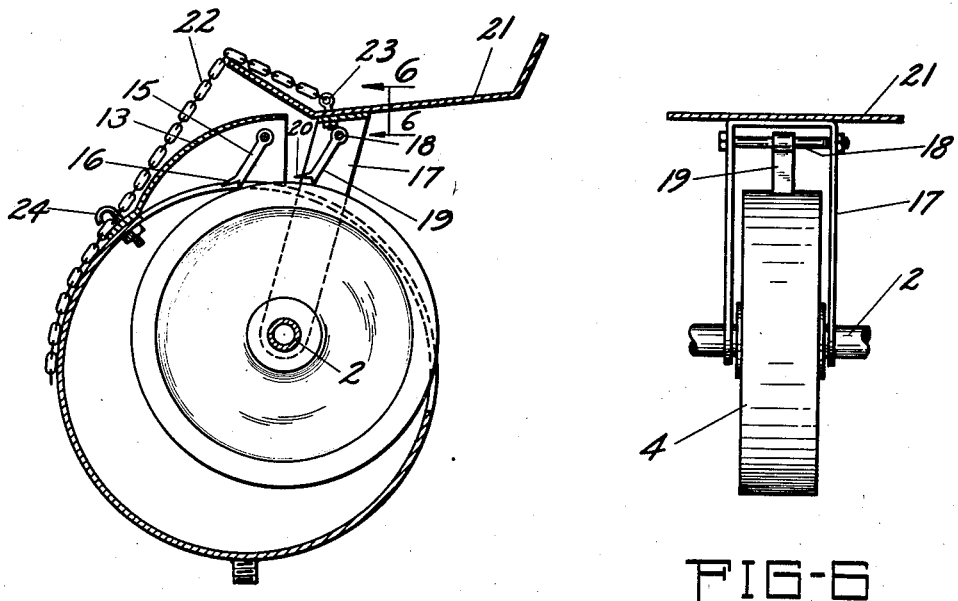
FIG-5
FIG-6
K. P. TESKE  INVENTOR.
BY *William C. Blackburn*
ATTORNEY May 16, 1939.　　　K. P. TESKE　　　2,158,094
METHOD OF FEEDING LIQUID MOLASSES
Filed March 25, 1938　　　3 Sheets—Sheet 3

K. P. TESKE　INVENTOR.
BY *William Blackburn*
ATTORNEY

Patented May 16, 1939

2,158,094

UNITED STATES PATENT OFFICE 2,158,094

METHOD OF FEEDING LIQUID MOLASSES

Karl P. Teske, Davenport, Iowa

Application March 25, 1938, Serial No. 198,091

2 Claims. (Cl. 119—51)

The present invention relates to the art of feeding live stock and more particularly relates to a process of feeding liquid molasses to stock, such as hogs and cattle.

Prior to the present invention, only small amounts of molasses have been fed to stock, as the only known modes of feeding this material were extremely unsatisfactory. Heretofore molasses has been fed to live stock in mixture with the remainder of the feed. Such feeding is unsatisfactory as the total food consumption per animal is decreased, perhaps due to the animals not enjoying the flavor of the molasses when mixed throughout their feed.

Alternatively it has been proposed to feed the molasses in liquid form in a slop trough. This procedure has been found unsatisfactory, as the animals, particularly in the case of hogs, get the molasses in their nostrils as well as in their mouths. Additionally the molasses in an open slop trough is diluted considerably by rain water, causing spoilage of the material. For these reasons, the amount of molasses consumed under this procedure is extremely limited.

Due to the lack of any suitable method of feeding molasses, this material has heretofore occupied an extremely minor position as a feeding material for live stock.

It is an object of the present invention to provide a method for feeding liquid molasses to stock by which method large amounts thereof may be fed without causing a decrease in the total amount of food consumed by the stock.

It is a further object of this invention to provide a method whereby molasses may be fed in sufficiently large quantities to live stock so that the health of the stock is substantially improved over the probable health when such large quantities have not been fed.

A further object is to provide a method for feeding molasses to hogs in considerable amounts so that molasses becomes a major constituent of the food consumed by the stock. In times of national emergency, such a substitution of molasses for grain in the feeding of stock would allow the grain otherwise used as stock feed to be diverted to channels supplying food to the population and would permit molasses, which it is impossible to feed in quantities to people, to be used for feeding to live stock, thereby providing the meat and fats needed by the people.

In accordance with the present invention, molasses is fed to live stock by applying the molasses to the lower portion of a substantially cylindrical member rotatable about a substantially horizontal axis, maintaining an upper portion of the surface of the member accessible to animals for feeding, by licking the surface, and allowing rotation of the member by the animals while feeding.

The surface of the substantially cylindrical member to which the molasses is applied in accordance with the present invention may be either the side or end surface of the member. Any suitable material may be used in the construction of this member though preferably it is made of wood which, it has been found, is particularly resistant to the action of molasses. Rotation of the member about a substantially horizontal axis is effected in any desired manner, for instance, means may be supplied for allowing the live stock to rotate the surface while feeding, though alternatively, the member may be actuated either by power or by manual means.

Rotation of the member, to the lower portion of which the molasses is applied, brings this portion of the surface thereof carrying the molasses into an upper position so it is maintained accessible to the live stock for feeding by licking the surface. Hogs, in particular, are quite prone to rub their bodies against a surface which is coated with molasses. As this would contaminate the molasses, the upper portion of the member is maintained at such an elevation that hogs cannot rub their bodies against this portion of the member.

A wide variety of specific devices may be employed for the performance of this process. Several such devices are shown in the accompanying drawings in which Fig. 1 is an elevation, in part broken away to show interior structure of one form of molasses feeder;

Fig. 4 is a perspective of a preferred form of device with which the present invention may be practiced;

Fig. 5 is a transverse section through the feeding drum shown in Fig. 4 and illustrates, in detail, the operating mechanism for the feeding wheel;

Fig. 6 shows, in front elevation, the feeding wheel of the device shown in Fig. 4, and illustrates the actuating plate in section, as if taken along the plane indicated by the line 6—6 in Fig. 5;

Figure 1:
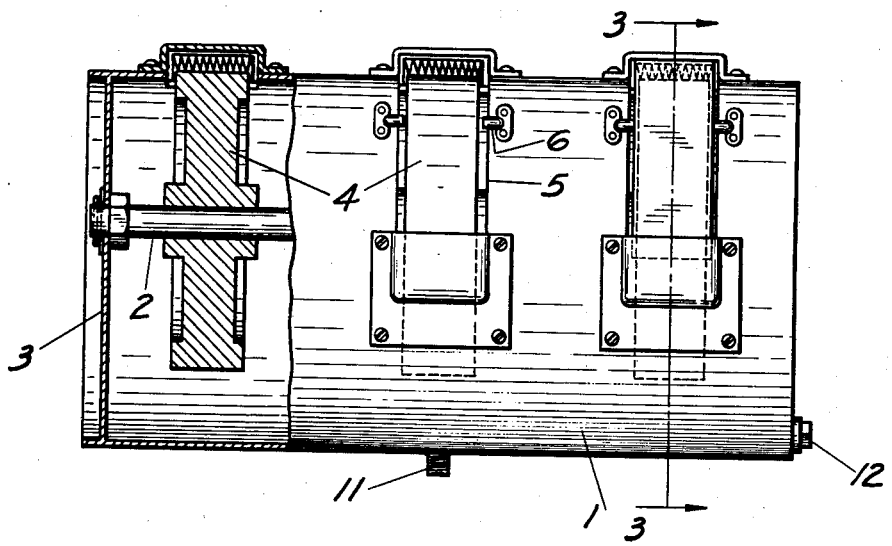
Figures 2, 3:
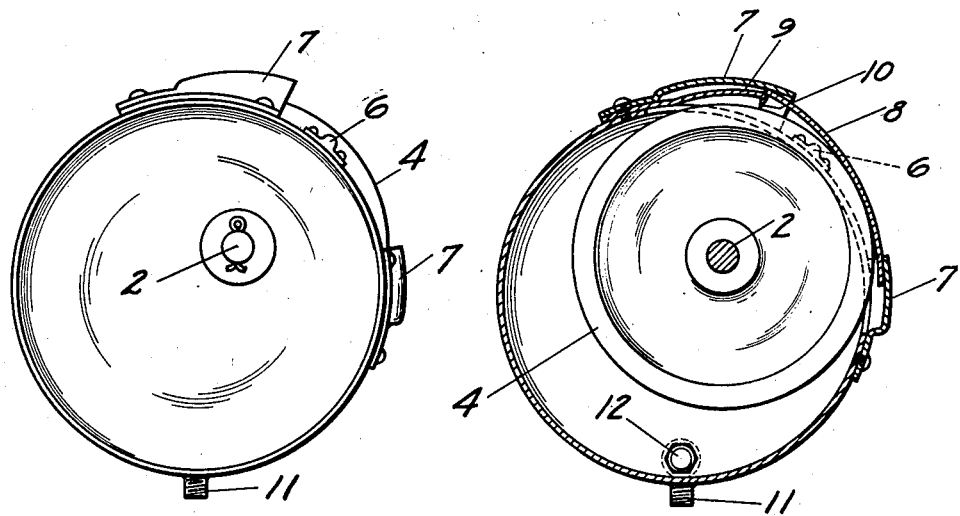
Fig. 2 is an end view of the device shown in Fig. 1.
Fig. 3 is a section on line 3—3 of Fig. 1.

In the form of device shown in Figs. 1, 2 and 3, a feeding drum 1, which may be supported in a horizontal position by any suitable framework, not shown, is provided with a longitudinal shaft 2 placed above and to one side of the center of the drum in a substantially horizontal position. As shown, this shaft extends through and may rotate in the heads 3 of the drum. A plurality of feeding wheels 4, preferably of wood, are carried by the shaft 2 and are arranged so that they may rotate freely thereon and may be slid therealong as desired. Each of the wheels 4 extends into the lower portion of the drum and also in proximity to one of a series of openings 5 in the upper portion of the drum. A lug 6 is secured to the drum at each side of each opening to guide the wheels away from the edges of the openings and thereby prevent the wheels rubbing against the sides of the openings. Caps 7 are placed over the upper and lower ends of each of the openings 5 and house the ends of a cover-plate 8 which may be placed over any of the wheels which it is desired to put out of operation. A spring arm 9 is secured to the drum beneath the upper cap 7 and has a series of teeth 10 at its free end which bear against the wheel so as to prevent reverse rotation thereof. Molasses may be supplied to the feeding drum through a suitable source of supply connected to the nipple 11 in the lower portion of the drum. To drain the contents of the drum, plug 12, which is located in the lower portion of the drum, may be removed.

In operation, molasses is applied to the lower portion of each of the wheels 4 by supplying it to the drum through the nipple 11. Herds of animals soon learn that they can obtain molasses by turning the wheel, either by licking the wheel or by taking hold of the wheel with their teeth, and, in that manner, forcing it over. Rotation of the wheel brings the molasses up to the upper portion of the wheel, and into a position in proximity to the opening 4 where the animals may secure the molasses by licking the wheel. The springs 9 prevent reverse rotation of the wheels due to the weight of the molasses on the forward side of each wheel during operation.

In the form of apparatus shown in Figs. 4 to 6, the general construction of the device is quite similar to that shown in Figs. 1 to 3; i. e., the drum 1 having openings 5 is provided with a shaft 2 upon which a plurality of wheels 4 are mounted. In Fig. 4, the drum is shown as supported by a framework 14.

In this form of apparatus, a cap 13 is positioned at the upper end of each opening 5. In place of the spring arm 9, a dog 15 is carried on a pivot, such as a bolt, supported by the sides of cap 13. If desired, sleeves may be placed on the pivot to avoid longitudinal displacement of the dog. The lower end of the dog 15 is provided with an angular finger 16 which prevents the dog from digging into the wheel sufficiently that the dog would pass a line connecting the centers of the pivot and the shaft 2.

In addition to these means, equivalent to the means shown in Figs. 1 to 3, the feeder shown in Figs. 4 to 6 is provided with a device whereby the animals may positively rotate the wheel while feeding. Such a rotating means is of particular utility since in the winter, in the colder portions of this country, molasses gets so thick that animals would have difficulty in turning the wheel otherwise.

This rotating means comprises a U-shaped member 17 which has two arms on opposite sides of the feeding wheel 5, the ends of which are apertured for reception of the shaft 2 which may be either tubular, as shown, or may be solid, as illustrated in Figs. 1 to 3. A pivot 18, which may be a bolt, passes through the U-shaped member near the bight portion thereof and has mounted thereon a dog or pawl 19 of a length to engage the periphery of the wheel. The dog 19, like the dog 15, has a finger 20 extending laterally therefrom to prevent it from swinging past center so that it would fail to function to cause rotation of the wheel. If it seems desirable, sleeves may be placed on the pivot 18 to prevent lateral displacement of the dog 19 along the pivot.

A plate 21 having its two ends bent up, as shown in Figs. 4 and 5, is rigidly secured to the bight portion of the U-shaped member so that it may swing about the shaft 2. A chain 22, which is attached to an eye 23 secured to plate 21, extends over the rear edge of the plate, as shown in Fig. 5, down to a hook 24 on which one of the links of the chain may be hooked. This arrangement provides for adjustment of the plate 21 whereby the device may be adjusted to the needs of animals of various sizes.

When an animal comes up to the feeding device, he places his head under the plate 21 and lifts up. This causes the pawl 19 to be forced into tight engagement with the wheel 4 and to rotate the same forwardly. When the animal lowers its head, the point of pawl 15 engages the surface of the wheel 4 and prevents backward rotation thereof, while the weight of the plate 21 causes it to drop down as far as permitted by the chain 23. The pawl 19 now engages a new place on the wheel, ready to rotate the same forwardly as soon as the plate is again lifted by an animal desiring to lick the molasses from the surface of the wheel. This procedure may be repeated indefinitely.

Figures 7, 8:
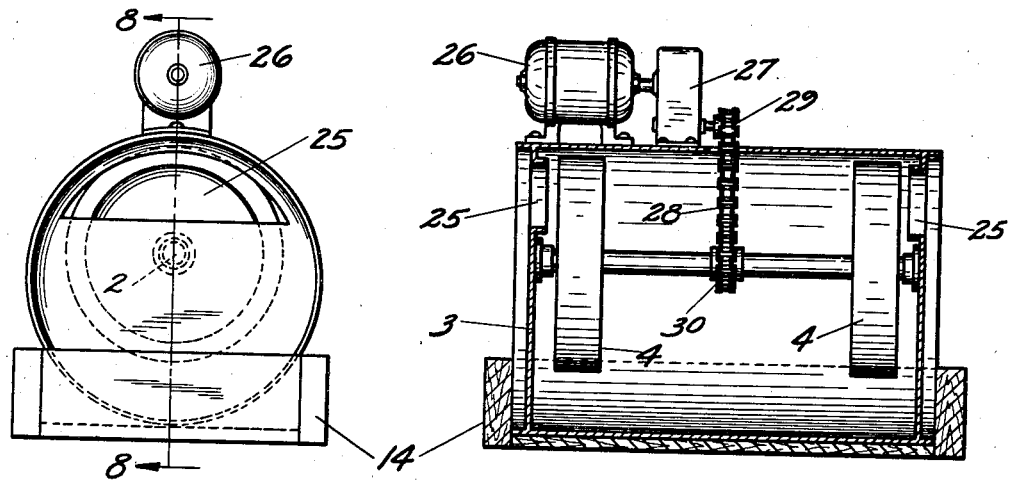
Fig. 7 is an end elevation of a power driven molasses feeder for carrying out the present method.
Fig. 8 is a section of the device shown in Fig. 7 substantially on line 8—8.

In the form of molasses feeder shown in Figs. 7 and 8, the shaft 2, upon which the feeding wheels 4 are carried, is located directly above the center of the drum. In this form of apparatus, the feeding openings 25 are positioned in the heads 3 of the drum above the shaft. Motor 26, secured to the upper side of the drum, is arranged to drive a reduction gear unit 27, also secured to the upper side of the drum. Through a drive chain 28, sprocket wheel 29, secured to the drive shaft of the reduction unit, drives shaft 2 by means of a sprocket wheel 30 secured to shaft 2. In this form of apparatus, wheels 4 are secured to the shaft 2 so that when power is supplied to motor 26 the wheels are continuously driven.

Figure 9:
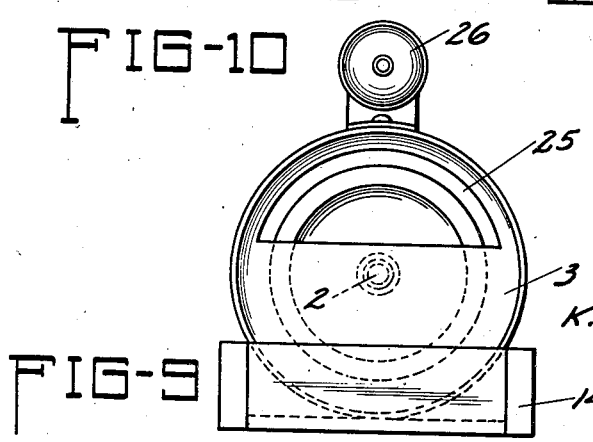
Fig. 9 is an end elevation of an apparatus similar to that shown in Fig. 7.

In order to secure more complete utilization of the molasses in the drum so that it is not necessary to fill the feeder so often, the shaft 2 may be positioned at the longitudinal axis of the drum, as shown in Fig. 9. This modification allows the wheels to extend farther to the bottom of the drum. By thus modifying the location of the shaft, a larger feeding opening may be provided.

Figures 10, 11:
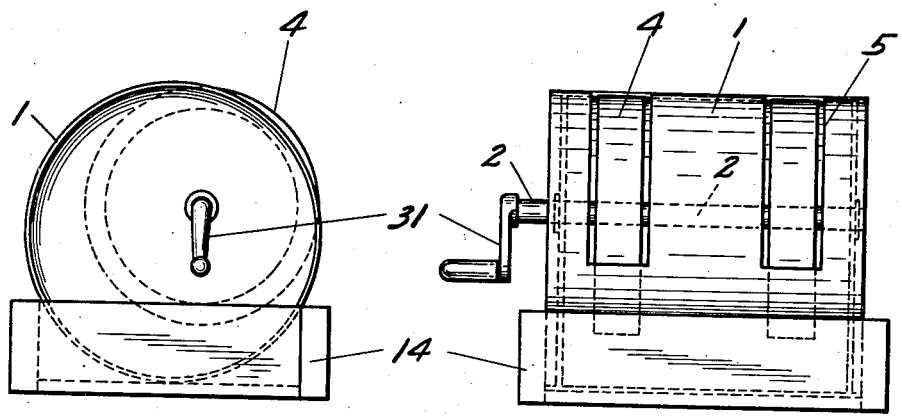
Fig. 10 is an end elevation of a form of apparatus which may be used in carrying out the invention.
Fig. 11 is a side elevation of the apparatus shown in Fig. 10.

The form of apparatus shown in Figs. 10 and 11 is of particular utility in localities where the cost of labor is extremely low. In this form of apparatus, the wheels 4 are mounted on an eccentric shaft and extend through openings 5 in the cylindrical wall of the drum, as shown in Fig. 1. A crank 31 is secured to one end of the shaft 2 whereby the wheels 4, which are fixed to the shaft, may be rotated by manually turning the crank.

The present application is, in part, a continuation of my co-pending application, Serial No. 118,748, filed January 2, 1937, and of my application, Serial No. 86,619, filed June 22, 1936.

Having now described my invention, I claim:

1. The method of feeding molasses to live stock which comprises applying molasses to the lower portion of the surface of a rotatable body and maintaining an upper portion of the surface accessible to said live stock.

2. The method of feeding molasses to live stock which comprises applying molasses to the lower portion of the surface of a body rotatable on a horizontal axis and maintaining an upper portion of the surface of said body accessible to said live stock.

KARL P. TESKE.